Nov. 4, 1958    L. B. ELLIS    2,858,987
FLOW CONTROL VALVE MEANS
Filed Sept. 13, 1955

INVENTOR.
Lockwood Byron Ellis
BY
L. D. Burek
ATTORNEY

United States Patent Office 2,858,987
Patented Nov. 4, 1958

2,858,987

FLOW CONTROL VALVE MEANS

Lockwood Byron Ellis, Birmingham, Mich., assignor to General Motors Corporation, Detroit, Mich., a corporation of Delaware Application September 13, 1955, Serial No. 534,024

3 Claims. (Cl. 236—101)

This invention relates to flow control valves in general and more particularly to manifold heat flow control valves used with automotive and other engines.

Flow control valves disposed within an engine exhaust conduit or elsewhere and adapted to divert hot engine exhaust gases for one purpose or another are subject to both the corrosive condensates and the pulsating flow of such gases; the former causes bearing seizure and reduces the serviceable life of the valve while the latter causes a most annoying and disagreeable rattling sound. To prolong the serviceable life of flow control valves it is common to provide increased valve shaft bearing tolerances to minimize the chance of bearing seizure due to the effect of the corrosive gas condensate. However, such increased tolerances also serve to make valve flutter noises more pronounced.

It is here proposed to provide a flow control valve for use within the exhaust system of an engine which may have increased valve shaft bearing tolerances without increased valve flutter noises. It is proposed to provide a compact valve assembly comprising known control means including thermostatic spring and counterweight members and to arrange such members in a manner which will guard against valve flutter due to pulsating gas flow. It is proposed to have both the thermostatic spring and counterweight members secured to the same end of the flow control valve shaft, to provide a more compact and simple valve assembly, and at the same time to have one of the members hold one end of the valve shaft down and in the direction of fluid flow through the valve, and the other hold the other end of the valve shaft in a like manner. The proposed arrangement of the thermostatic spring and counterweight is to produce a force couple acting to hold the unweighted end of the valve shaft in the direction of fluid flow and thus unaffected by the pulsating gas flow through the flow passage of the valve member.

It is further proposed to provide a fluid flow control valve including counterweighted thermostatic control means wherein the control means are more compactly arranged, thereby greatly facilitating assembly and minimizing the number of necessary parts. The counterweight is formed to partially receive the thermostatic spring for greater compactness. A limit stop groove is also provided within the counterweight member to receive a stop pin projecting from the valve body to limit the travel of the counterweight as necessary to close and open the valve plate within the fluid flow passage. It is still further proposed to make use of this stop pin by having the pin engaged by the free end of the thermostatic spring member; the spring acting thereagainst in rotating the valve shaft to move the valve plate to a closed position within the flow passage.

It is further proposed to provide limit stop means including antirattle features for use with the proposed fluid flow control valve or other similarly controlled valve means. The proposed limit stop features include not only the limit stop groove and pin aforementioned but also means provided upon the counterweight member and disposed to engage the free end of the thermostatic spring extending beyond the stop pin for resiliently limiting travel of the counterweight prior to engagement of the stop pin with the end of the limit stop groove.

Figure 1:
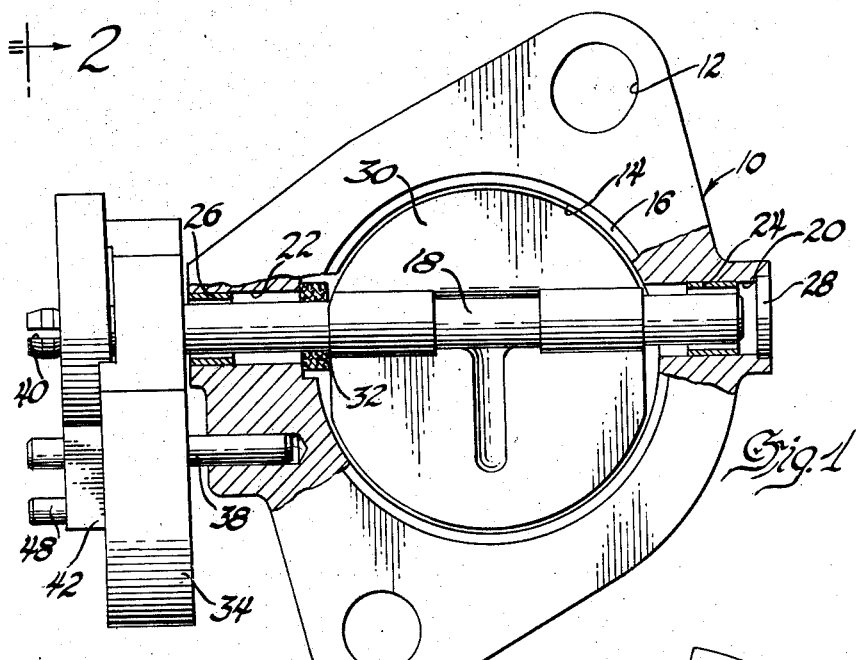
Figure 1 is a top view of a flow control valve including the present inventions having parts broken away and shown in cross-section.

The flow control valve means shown in the drawing is of the type commonly referred to as a manifold heat flow control valve and is such as is used within the exhaust system of an engine for diverting engine exhaust gases about a charge induction chamber to facilitate more rapid engine warm-up. Because this type of valve is relatively well known details of the exhaust system within which the valve is normally used have not been shown.

The flow control valve includes a valve body 10 adapted to be secured within a flow conduit (not shown) by fastening means extending through holes 12 provided therein. A flow passage 14 is provided through the valve body and one edge thereof is beveled as at 16. A valve shaft 18 is extended across the flow passage and is received within aligned openings 20 and 22 provided through opposite side walls of the valve body. The shaft 18 is loosely journaled within bearings 24 and 26 provided in openings 20 and 22 respectively and extends through opening 22 and beyond the valve body. Opening 20 is closed by a plug 28 secured within the outer end thereof.

A valve plate 30 is secured to the valve shaft 18 within the flow passage 14 and is formed to close the passage when disposed transversely thereacross. A sealing member 32 is provided on the shaft 18 between the valve plate and the opening 22 and is adapted to be gravitationally held in engagement thereover when the valve body is installed in an exhaust system at a properly inclined angle.

A counterweight member 34 is secured to valve shaft 18 upon the end thereof extending beyond the valve body. The weighted member 34 is here shown to be semicircular in shape and to include a limit stop groove or slot 36 formed through the face thereof. A stop pin 38 is secured within the valve body 10 and is received within the slot 36. The travel of the counterweight and consequently of the shaft 18 and valve plate 30, is limited to the relative movement permitted by pin 38 within limit slot 36; this being such as will permit moving valve plate 30 from closed to open positions within passage 14.

The end of shaft 18 is slotted as at 40 to receive one end of a bi-metal thermostatic spring member 42 upon the outer end of the shaft. The thermostatic spring 42 is axially spaced from the counterweight 34 but is nested closely thereto; the counterweight being provided with a recessed central section 44 partially receiving the spring member therewithin.

The free end 46 of the thermostatic spring member 42 is formed to engage stop pin 38 and is biased to act against such pin. The end 46 of the spring 42 also extends beyond the pin 38 in a position to be engaged by a limit pin 48 provided upon the counterweight member 34 and disposed to engage the spring end prior to engagement of the stop pin 38 within the end of limiting slot 36.

Figure 3:
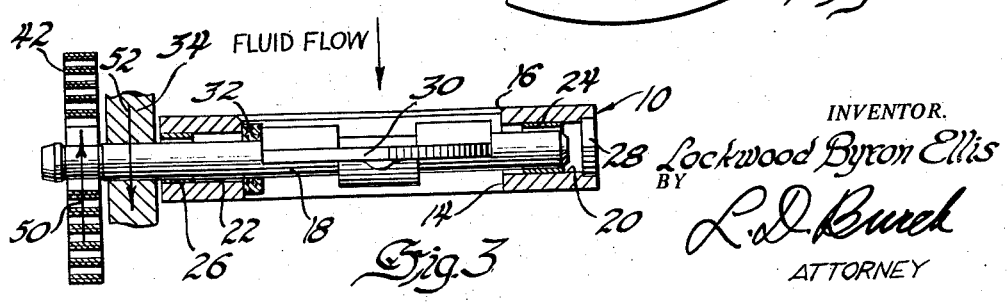
Figure 3 is a reduced cross-sectional side view of the flow control valve shown in Figure 1 taken substantially in the plane of the valve shaft shown therein.

The valve assembly just described has the thermostatic spring 42 engaged with pin 38 and is wound sufficiently tight to torsionally bias the valve shaft 18 to a rotational position disposing valve plate 30 transversely across flow passage 14. There is also a biasing force effected by the thermostatic spring 42 lifting the weighted end of the shaft 18 as shown in Figure 3 by arrow 50. At the same time the counterweight 34 is secured to shaft 18 with its center of gravity radially disposed from the shaft axis to torsionally bias the shaft to a rotational position tending to dispose the valve plate 30 in an open position within flow passage 14. The weight of the counterweight also tends to hold the weighted end of the shaft 18 down upon bearing 26 as shown in Figure 3 by arrow 52.

It will be appreciated that having the control means, comprising counterweight 34 and thermostatic spring 42, both disposed at one end of the valve shaft 18 would normally tend to cause the unweighted end of shaft 18 to seat itself to the upper side of bearing 24; due to force reactions from the control means. In such cases, when the valve plate 30 is nearly or fully closed, the exhaust gas impulses at low engine speeds will periodically overcome such weighted force and jump the shaft to the lower or downstream side of bearing 24 causing a tapping noise known as valve flutter.

In the present instance the biasing force of the thermostatic spring 42, acting against pin 38 with which it is engaged, tends to lift the weighted end of shaft 18. At the same time the gravitational pull on counterweight 34 opposes the effect of the spring and tends to seat the weighted end of the shaft. This opposition of forces, and the spaced relation of the forces, produces a force couple tending to rotate the shaft 18 end over end. With the spring force applied outboard of the counterweight force on the weighted end of the shaft, the unweighted end of the shaft is seated against the downstream side of its bearing 24. Referring to Figure 3, the vertical force vectors are represented by vectors 50 and 52 for the spring and counterweight respectively.

Figure 2:
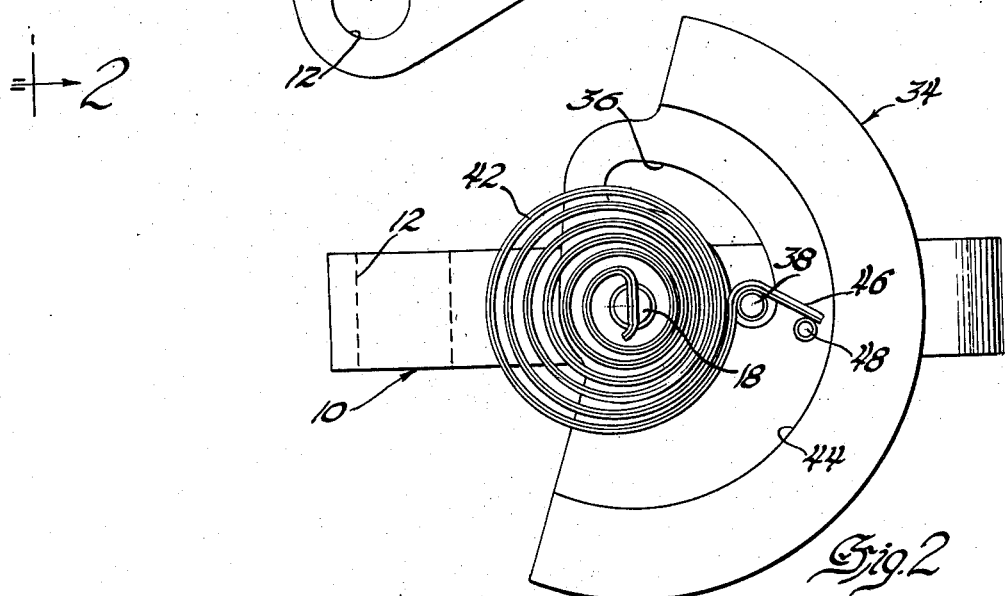
Figure 2 is an end view of the flow control valve shown in Figure 1 taken in the plane of line 2—2 thereon, rotated 90°, and looking in the direction of the arrows.

The force couple just described, while effective to seat the unweighted end of shaft 18, will also unseat the weighted end of the shaft from the downstream side of its bearing 26 if the moment produced by the spring force times its lever arm distance from bearing 26 is greater than the moment produced by the counterweight force times its lever arm distance from bearing 26 (assuming the weight and moment of the overhanging end of shaft 18 to be included with the effect of the counterweight). However, such a result is not detrimental to the flutter-free operation of the valve means provided that the spring force seating the shaft 18 to the upstream side of bearing 26 is adequate to resist the exhaust gas pressure acting in opposition thereto, or if, as in the present instance, the spring force is applied diagonally upward so as to include a vertical component as shown in Figure 3 and a horizontal component which though not pictured is apparent from the disposition of the spring as shown in Figure 2. The effect of the diagonally upward biasing of the weighted end of the shaft 18 is to hold the weighted end of the shaft in engagement with the inner side wall of bearing 26 so that exhaust gas pressure applied to the valve plate 30 will act on the shaft to slide the weighted end thereof along the inner bearing wall to the seated position on the downstream side of the bearing, as shown by Figure 3, without losing contact therewith and consequently without any tapping noise or so-called valve flutter.

The operation of the manifold heat flow control valve is generally conventional, the thermostatic spring contracting within itself upon being heated, by conduction through shaft 18, to turn the shaft and change the position of valve plate 30 within flow passage 14. The counterweight 34 takes over as the weight thereof overcomes the diminishing spring biasing force of thermostat means 42, to the limits permitted by engagement of stop pin 38 with the ends of limiting slot 36. An exception is made by the engagement of pin 48 with the free end 46 of spring 42 just prior to the pin 38 reaching the end of slot 36, as the valve plate is returned to its closed position, to provide a rattle-free resilient stop.

What is claimed is:

1. A fluid flow control valve comprising a valve body having a flow passage formed therein, a valve shaft extending across said passage and journaled within opposite side walls of said valve body, a valve secured to said shaft within said passage, and a counterweight member and thermostatic spring member disposed on one end of said shaft, said spring member spaced outermost thereon and engaged with said valve body to bias said shaft end in a direction opposite to the effect of said counterweight member and with a force not less than the effect of said counterweight and sufficient to bias the other end of said valve shaft in the direction of fluid flow through said passage.

2. Means for preventing valve plate flutter within a valve member having a flow passage formed therethrough and including a valve shaft journaled within opposite side walls of said member, a valve plate disposed within said passage and secured to said valve shaft, a weight member located on one end of said valve shaft and gravitationally urging the end of said valve shaft downwardly, a spring member located on the same end of said valve shaft as said weight member and outside of said weight member, said spring member biasing said one shaft end upwardly and providing a force couple with said weight member tending to rotate said shaft end over end and to seat the other end of said shaft downstream of fluid flow through said passage, the moment of said spring biasing force being greater than the moment of said weight member and sufficient to retain said one shaft end in engagement with the side wall receiving said one shaft end under all fluid flow conditions.

3. Limit stop means for use with a fluid flow control valve as defined in claim 1 including stop means comprising a limit stop slot formed within said counterweight, a limit stop pin provided on said valve member and received within said slot, said pin being also engaged by the free end of said thermostatic spring, and stop means provided upon said counterweight and disposed to engage the free end of said spring prior to the engagement of said stop pin with the end of said slot.

References Cited in the file of this patent

UNITED STATES PATENTS

| | | |
|---|---|---|
| 1,998,636 | Porter | Apr. 23, 1935 |
| 2,169,321 | Jones | Aug. 15, 1939 |
| 2,284,674 | Murdock | June 2, 1942 |
| 2,564,112 | Kittler | Aug. 14, 1951 |
| 2,766,768 | Brown | Oct. 16, 1956 |